United States Patent
Fernald et al.

(10) Patent No.: US 6,886,089 B2
(45) Date of Patent: Apr. 26, 2005

(54) METHOD AND APPARATUS FOR ACCESSING PAGED MEMORY WITH INDIRECT ADDRESSING

(75) Inventors: Kenneth W. Fernald, Austin, TX (US); Alvin C. Storvik, II, Austin, TX (US); Paul Highley, Austin, TX (US); Brent Wilson, Austin, TX (US)

(73) Assignee: Silicon Labs CP, Inc., Austin, TX (US)

( * ) Notice: Subject to any disclaimer, the term of this patent is extended or adjusted under 35 U.S.C. 154(b) by 278 days.

(21) Appl. No.: 10/295,585

(22) Filed: Nov. 15, 2002

(65) Prior Publication Data

US 2004/0098557 A1 May 20, 2004

(51) Int. Cl.⁷ .............................................. G06F 12/00
(52) U.S. Cl. ...................................... 711/202; 711/206
(58) Field of Search ................................. 711/202–208

(56) References Cited

U.S. PATENT DOCUMENTS

| | | | | |
|---|---|---|---|---|
| 5,214,775 A | * | 5/1993 | Yabushita et al. .......... 711/117 |
| 5,509,131 A | * | 4/1996 | Smith et al. ................. 711/206 |
| 5,752,261 A | * | 5/1998 | Cochcroft, Jr. ............. 711/133 |
| 6,330,649 B1 | * | 12/2001 | Frank et al. ................. 711/163 |

* cited by examiner

Primary Examiner—Nasser Moazzami
(74) Attorney, Agent, or Firm—Howison & Arnott, L.L.P.

(57) ABSTRACT

Method and apparatus for accessing paged memory with indirect addressing. A a method for changing pages of memory in an indirect addressed memory having a plurality of addressable locations therein is diclosed. An index indicative of the page of the memory being addressed is stored in a memory location. The memory is addressed with a direct address that selects one or more of the addressable locations in the addressed page of memory. An interrupt is received from a resource capable of generating an interrupt, which interrupt has associated therewith a defined one of the pages of memory. In response to generation of the interrupt, the value of the stored index t is changed o an index associated with the defined one of the pages of memory associated with the resource. In response to receiving a signal indicative of the generated interrupt having been serviced by a system that services interrupts, the stored index is changed to a different index.

50 Claims, 10 Drawing Sheets

FIG. 15A

| ADDRESS | SFR PAGE | 0(8) | 1(9) | 2(A) | 3(B) | 4(C) | 5(D) | 6(E) | 7(F) |
|---|---|---|---|---|---|---|---|---|---|
| F8 | 0 | SPI0CN CAN0CN | PCA0L | PCA0H | PCA0CPL0 | PCA0CPH0 | PCA0CPL1 | PCA0CPH1 | WDTCN (ALL PAGES) |
|    | 1 |  |  |  |  |  |  |  |  |
|    | 2 | P7 |  |  |  |  |  |  |  |
|    | 3 |  |  |  |  |  |  |  |  |
|    | F |  |  |  |  |  |  |  |  |
| F0 | 0 | B (ALL PAGES) |  |  |  |  |  | EIP1 (ALL PAGES) | EIP2 (ALL PAGES) |
|    | 1 |  |  |  |  |  |  |  |  |
|    | 2 |  |  |  |  |  |  |  |  |
|    | 3 |  |  |  |  |  |  |  |  |
|    | F |  |  |  |  |  |  |  |  |
| E8 | 0 | ADC0CN ADC2CN | PCA0CPL2 | PCA0CPH2 | PCA0CPL3 | PCA0CPH3 | PCA0CPL4 | PCA0CPH4 | RSTSRC |
|    | 1 |  |  |  |  |  |  |  |  |
|    | 2 | P6 |  |  |  |  |  |  |  |
|    | 3 |  |  |  |  |  |  |  |  |
|    | F |  |  |  |  |  |  |  |  |
| E0 | 0 | ACC (ALL PAGES) | PCA0CPL5 | PCA0CPH5 |  |  |  | EIE1 (ALL PAGES) | EIE2 (ALL PAGES) |
|    | 1 |  |  |  |  |  |  |  |  |
|    | 2 |  | XBR0 | XBR1 | XBR2 | XBR3 |  |  |  |
|    | 3 |  |  |  |  |  |  |  |  |
|    | F |  |  |  |  |  |  |  |  |
|    |   | 0(8) | 1(9) | 2(A) | 3(B) | 4(C) | 5(D) | 6(E) | 7(F) |

*FIG. 15B*

| ADDRESS | SFR PAGE | 0(8) | 1(9) | 2(A) | 3(B) | 4(C) | 5(D) | 6(E) | 7(F) |
|---|---|---|---|---|---|---|---|---|---|
| D8 | 0<br>1<br>2<br>3<br>F | PCA0CN<br>CAN0DATL | PCA0MD<br>CAN0DATH | PCA0CPM0<br>CAN0ADR | PCA0CPM1<br>CAN0TST | PCA0CPM2 | PCA0CPM3 | PCA0CPM4 | PCA0CPM5 |
| D0 | 0<br>1<br>2<br>3<br>F | PSW<br>(ALL PAGES) | REF0CN | DAC0L<br>DAC1L | DAC0H<br>DAC1H | DAC0CN<br>DAC1CN | | HVA0CN | |
| C8 | 0<br>1<br>2<br>3<br>F | TMR2CN<br>TMR3CN<br>TMR4CN | TMR2CF<br>TMR3CF<br>TMR4CF | RCAP2L<br>RCAP3L<br>RCAP4L | RCAP2H<br>RCAP3H<br>RCAP4H | TMR2L<br>TMR3L<br>TMR4L | TMR2H<br>TMR3H<br>TMR4H | | SMB0CR |
| C0 | 0<br>1<br>2<br>3<br>F | SMB0CN<br>CAN0STA | SMB0STA | SMB0DAT | SMB0ADR | ADC0GTL<br>ADC2GT | ADC0GTH | ADC0LTL<br>ADC2LT | ADC0LTH |
| B8 | 0<br>1<br>2<br>3<br>F<br>FF | IP<br>(ALL PAGES) | SADEN0 | AMX0CF<br>AMX2CF | AMX0SL<br>AMX2SL | ADC0CF<br>ADC2CF | AMX0PRT | ADC0L<br>ADC2 | ADC0H |
| | | 0(8) | 1(9) | 2(A) | 3(B) | 4(C) | 5(D) | 6(E) | 7(F) |

| ADDRESS | SFR PAGE | 0(8) | 1(9) | 2(A) | 3(B) | 4(C) | 5(D) | 6(E) | 7(F) |
|---|---|---|---|---|---|---|---|---|---|
| B0 | 0<br>1<br>2<br>3<br>F | P3 (ALL PAGES) | | | | | | | FLSCL<br><br><br><br>FLACL |
| A8 | 0<br>1<br>2<br>3<br>F | IE (ALL PAGES) | SADDR0 | | | | P1MDIN | P2MDIN | P3MDIN |
| A0 | 0<br>1<br>2<br>3<br>F | P2 (ALL PAGES) | EMI0TC | EMI0CN | EMI0CF | P0MDOUT | P1MDOUT | P2MDOUT | P3MDOUT |
| 98 | 0<br>1<br>2<br>3<br>F | SCON0<br>SCON1 | SBUF0<br>SBUF1 | SPI0CFG | SPI0DAT | P4MDOUT | SPI0CKR<br><br><br>P5MDOUT | P6MDOUT | P7MDOUT |
| 90 | 0<br>1<br>2<br>3<br>F | P1 (ALL PAGES) | SSTA0 | | | | | SFRPGCN | CLKSEL |
| 88 | 0<br>1<br>2<br>3<br>F | TCON<br>CPT0CN<br>CPT1CN<br>CPT2CN | TMOD<br>CPT0MD<br>CPT1MD<br>CPT2MD | TL0<br><br><br><br>OSCICN | TL1<br><br><br><br>OSCICL | TH0<br><br><br><br>OSCXCN | TH1 | CKCON | PSCTL |
| 80 | 0<br>1<br>2<br>3<br>F | P0 (ALL PAGES) | SP (ALL PAGES) | DPL (ALL PAGES) | DPH (ALL PAGES) | SFRPAGE (ALL PAGES) | SFRNEXT (ALL PAGES) | SFRLAST (ALL PAGES) | PCON (ALL PAGES) |
| | | 0(8) | 1(9) | 2(A) | 3(B) | 4(C) | 5(D) | 6(E) | 7(F) |

*FIG. 15C*

METHOD AND APPARATUS FOR ACCESSING PAGED MEMORY WITH INDIRECT ADDRESSING

CROSS-REFERENCE TO RELATED APPLICATIONS

This application is related to pending U.S. patent application Ser. No. 10/295,721 entitled "PAGING SCHEME FOR A MICROCONTROLLER FOR EXTENDING AVAILABLE REGISTER SPACE" filed concurrently herewith.

TECHNICAL FIELD OF THE INVENTION

The present invention pertains in general to systems for interfacing a processor with a peripheral device through special function registers and, more particularly, to a paging scheme to expand the I/O memory capability of a given processor to facilitate interfacing with a plurality of peripheral devices.

BACKGROUND OF THE INVENTION

Processors are provided Special Function Registers (SFRs) that allow a processor to access control/configuration/status information for a particular peripheral device such as a Universal Asynchronous Receiver/Transmitter (UART), a Serial Port Interface (SPI), etc., or other resource To interface with each of these peripherals, or resources, the processor need only address the SFR associated with that peripheral device in order to provide configuration information, status information, control information, etc. for that particular peripheral device or to communicate with that particular peripheral device to forward information thereto or retrieve information therefrom so as to, for example, activate that peripheral device. One such product that utilizes SFRs to communicate with peripheral devices is a C8051 manufactured by Cygnal Integrated Products, the present assignee. The problem that exists with current products is that the processors have a finite address space for SFRs and, as such, are limited in the number of SFRs (and, as a result, resources/peripherals) that can be addressed and, thus, facilitated.

SUMMARY OF THE INVENTION

The present invention disclosed and claimed herein, in one aspect thereof, comprises a method for changing pages of memory in an indirect addressed memory having a plurality of addressable locations therein. An index indicative of the page of the memory being addressed is stored in a memory location. The memory is addressed with a direct address that selects one or more of the addressable locations in the addressed page of memory. An interrupt is received from a resource capable of generating an interrupt, which interrupt has associated therewith a defined one of the pages of memory. In response to generation of the interrupt, the value of the stored index t is changed o an index associated with the defined one of the pages of memory associated with the resource. In response to receiving a signal indicative of the generated interrupt having been serviced by a system that services interrupts, the stored index is changed to a different index.

BRIEF DESCRIPTION OF THE DRAWINGS

For a more complete understanding of the present invention and the advantages thereof, reference is now made to the following description taken in conjunction with the accompanying Drawings in which:

FIGS. 15A-C illustrate a map of the SFR space; and

DETAILED DESCRIPTION OF THE INVENTION

Figure 1:
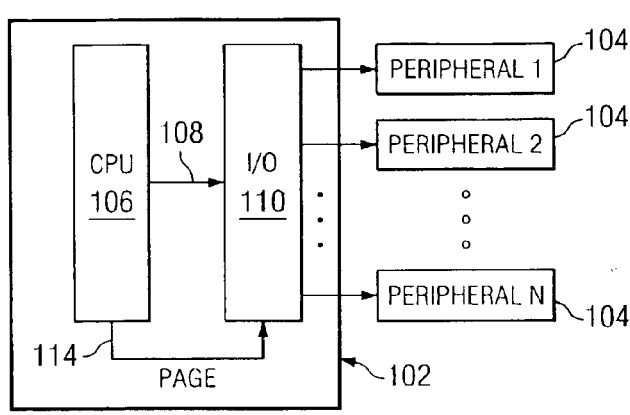
FIG. 1 illustrates an overall block diagram of an integrated circuit utilizing the paging scheme of the present disclosure.

Referring now to FIG. 1, there is illustrated a block diagram of system 102 for interfacing with a plurality of peripheral devices 104. Sometimes these peripheral devices 104 are referred to as system resources, as they provide an expansion of the capabilities of the overall system 102. The system 102 includes a central processing unit (CPU) 106 which is operable to interface through a bus connection 108 to an input/output device (I/O) 110 with the peripheral devices 104. The CPU 106 can be implemented with a microprocessor, a microcontroller unit or any type of processing device that has the capability of operating in an address space and generating addresses to Write or Read information to or from a storage device. The CPU 106 in the present embodiment has the ability to address through the bus 108 a finite number of addressable memory locations that exist within a defined CPU address space, typically limited by the width of the address bus. Each of the peripheral devices 104 has to be associated with an addressable location in addressable memory space. However, if the number of SFRs exceeds the number of available addressable memory locations, then the addressable memory space needs to be expanded. The I/O device 110 of the present disclosure has the capability of addressing with more addressable memory locations than exist within CPU memory space, thus allowing more peripheral devices 104 to be accommodated. The I/O device has a paging function that is facilitated through control signals received from the CPU 106 through a paging interface 114 with the I/O device 110. Therefore, the CPU 106 can address the defined CPU address space in a conventional manner but provide control signals to the I/O device 110 to select different pages in an expanded address space, as will be described hereinbelow.

Figure 2:
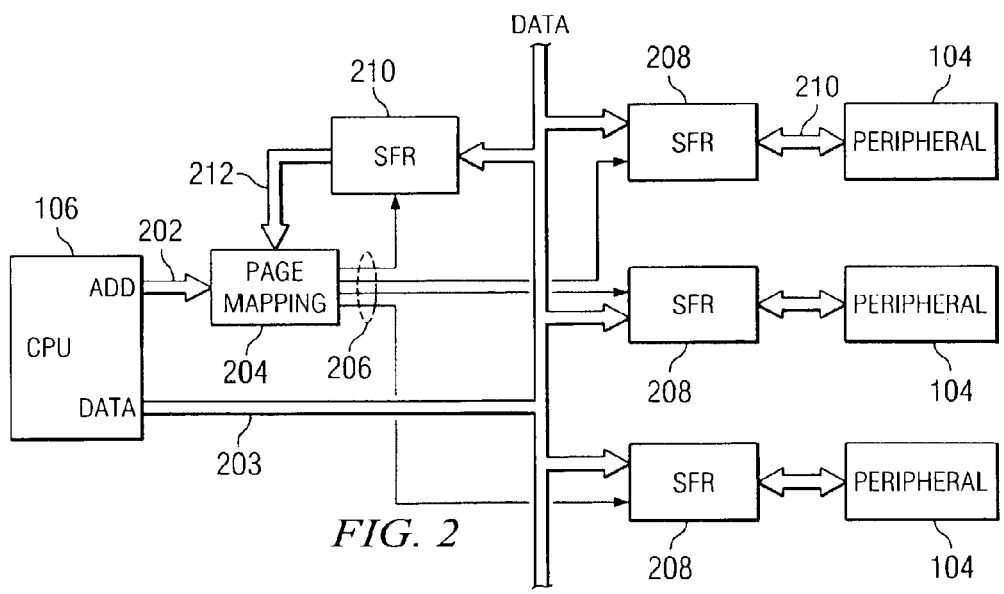
FIG. 2 illustrates a diagrammatic view of the operation for interfacing between the CPU and the peripheral.

Referring now to FIG. 2, there is illustrated a diagrammatic view of a detail of the paging operation. The CPU 106, in the present embodiment, comprises an 8051 microprocessor core. The 8051 microprocessor core is very conventional in the art and has the capability of dealing with a plurality of Special Function Registers (SFRs), which SFRs occupy a predetermined portion of the 8051 microprocessor core address space, this referred to as the SFR address space. There are a number of the SFRs that are associated with operational functions of the CPU 106, and others that are associated with various external and internal resources, such as the peripheral devices 104. These SFRs are hardware registers that are addressable so as to allow the CPU 106 to load data therein and retrieve data therefrom. Standard 8051 microprocessor architectures support 128 SFR locations. With the use of the paging scheme described herein, the SFR address space can be expanded without redesigning the 8051 microprocessor core.

The CPU 106 generates an address on a processor address bus 202 within the SFR address space and data on a data bus 203. The address on the address bus 202 is expanded through a mapping device 204 to facilitate handling an expanded address space. The output of the mapping device 204 comprises a plurality of address select lines 206. As will also be described hereinbelow, the mapping of pages utilizes a page pointer.

There are provided a plurality of SFRs 208 that are each operable to interface with associated ones of the peripheral devices 104. Each peripheral device 104 is interfaced with its associated SFR 208 through status/configuration/control lines 211. The address bus 202 is interfaced with each of the SFRs 208 and a select one of the address select lines 206 is also interfaced with each of the SFRs 208 for addressing thereof. There is also provided a page pointer SFR 210 which exists in the address space of the SFRs and is operable to store the page pointer. This page SFR pointer provides the page pointer as an output to the page mapping device 204 through a bus 212 which provides information to the page mapping device 204 as to which page in the address space is to be addressed. This page pointer comprises an 8-bit address in this embodiment. Since the CPU 106 only has the capability of addressing 128 SFRs within the SFR address space in the present embodiment an 8-bit pointer provides 255 additional pages of SFR address space. This pointer in effect expands the address for the 128 SFRs, which is a 7-bit address, to a 15-bit address. However, the effective address is generated in such a way that the CPU 106 need not be modified.

In operation, as will be described in more detail hereinbelow, the CPU 106 writes the page pointer to the SFR 210, the default being for page "0," after which the page mapping device 204 then points to a different page. The CPU 106 will then run in its normal mode and access the peripheral device 104 in accordance with the normal operating mode program. For example, suppose that in the SFR address space the timer function for a UART, an existing peripheral device, was associated with an SFR address "$88_h$" in one example. To the program of CPU 106, this UART function will always be at that location in the SFR address space for a given page. If another UART were available, but associated with a different page, that particular function would be associated with that SFR at that address location "$88_h$" for that associated page. By merely changing the page pointer, a different UART is retrieved for access by the CPU 106, but the code that operates with any particular function of the UART need not be changed, as the address in SFR address space has not changed, just the page. With the paging scheme of the present disclosure, 256 pages of SFR address space can be accessed that will allow a large number of resources such as UARTs to be facilitated, each with a different configuration. As such, this will allow multiple UARTs, for example, to exist on different pages, each with a common SFR address on the associated page, and only the page pointer needs to be changed in order to select the particular UART. For example, if an SFR for a UART function were set at SFR address $88_h$, the instruction coded need only concern itself with this address and not with the page, this allowing a common routine to be utilized for physically different but similar resources to be interfaced with, such as UARTs. This advantage will be described in more detail hereinbelow with respect to the handling of interrupts.

Figure 3:
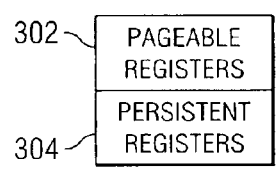
FIG. 3 illustrates a diagrammatic view of the address space for the page able registers and the persistent registers.

Referring now to FIG. 3, there is illustrated a diagrammatic view of the portion of the memory space occupied by the SFR registers. This portion of the memory space is associated with a plurality of registers, these registers being either page able registers 302 or persistent registers 304. Pageable registers are registers that are accessible through both the address within the SFR address space and the page pointer. The persistent registers 304 occupy both the SFR space and the "page pointer space" which defines which page a register is present in. The persistent register constitutes a register that exists in the SFR space for all pages and does not change, i.e., it is the same hardware register. Persistent registers 304 alias to two or more (i.e., ALL) pages of the SFR address space. This will be described in more detail hereinbelow.

Figure 4:
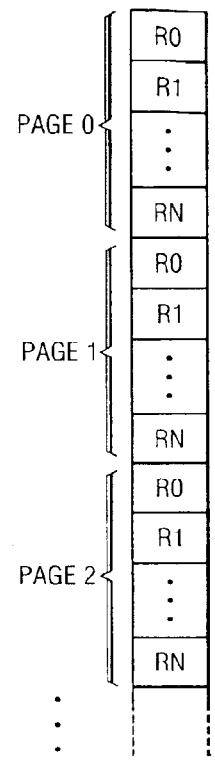
FIG. 4 illustrates a more detailed diagrammatic view of the address space.

Referring now to FIG. 4, there is illustrated a diagrammatic view of the SFR register space. A plurality of pages of SFR register space are illustrated, each comprising a plurality of SFR registers $R_0, R_1, \ldots, R_N$. Each page contains the same number of registers which, in the present disclosure for the CPU 106 comprising an 8051 microprocessor, is 128 SFRs. By changing the page pointer, a different set of registers can be accessed in the address space. However, as will be described hereinbelow, there are certain ones of the registers that occupy different pages in the address space but are in effect the same physical hardware register, these referred to as "persistent" SFRs.

Figure 5:
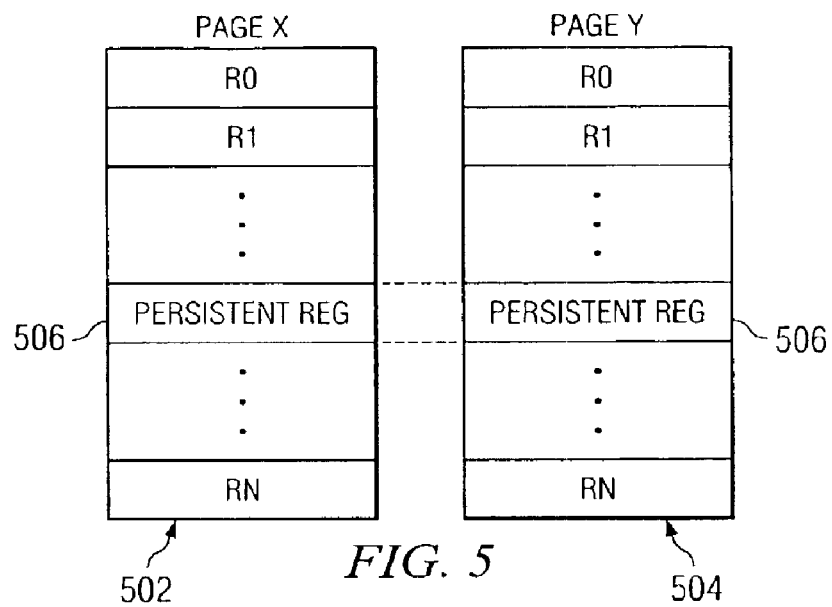
FIG. 5 illustrates a diagrammatic view of the operation of a persistent register.

Referring now to FIG. 5, there is illustrated a diagrammatic view of two pages, PageX and PageY. PageX is illustrated by page 502 and PageY is illustrated by a page 504. Page 502 illustrates a single persistent register 506 that is disposed within the set of $R_0, R_1, \ldots, R_N$. This persistent register 506 is addressable by one of the SFR addresses. When the pointer is changed to that associated with the page 504, a different set of registers will be addressed. However, when the address of the persistent register in PageY is impressed upon the address bus, the same persistent register 506 will be accessed. One reason for having persistent registers is to facilitate the need for certain SFRs to remain the same regardless of the page. For example, there are accumulator SFRs that contain information that must "persist" between pages, i.e., they cannot change. Further, there are certain I/O functions that also persist and will have the same configuration or the same contents of the SFR regardless of the page. Additional information associated with the 8051 processor that is both stored in the SFR address space and is required for operation thereof regardless of the page are such things as the Data Pointer Low/High, Stack Pointer, Interrupt Enables, Accumulators, B-Register, etc. This eliminates the need to configure those registers for each page, such that a copy would exist on each page. If there were in fact a separate set of physical registers for each page, then the common registers would have to have information transferred therebetween for all operating modes and for all pages, i.e., they would have to maintain coherency therebetween. However, the system could operate without persistent SFRs, either by reproducing the information in each page or by program instructions that would result in returning to a default page for certain operations.

Figure 6:
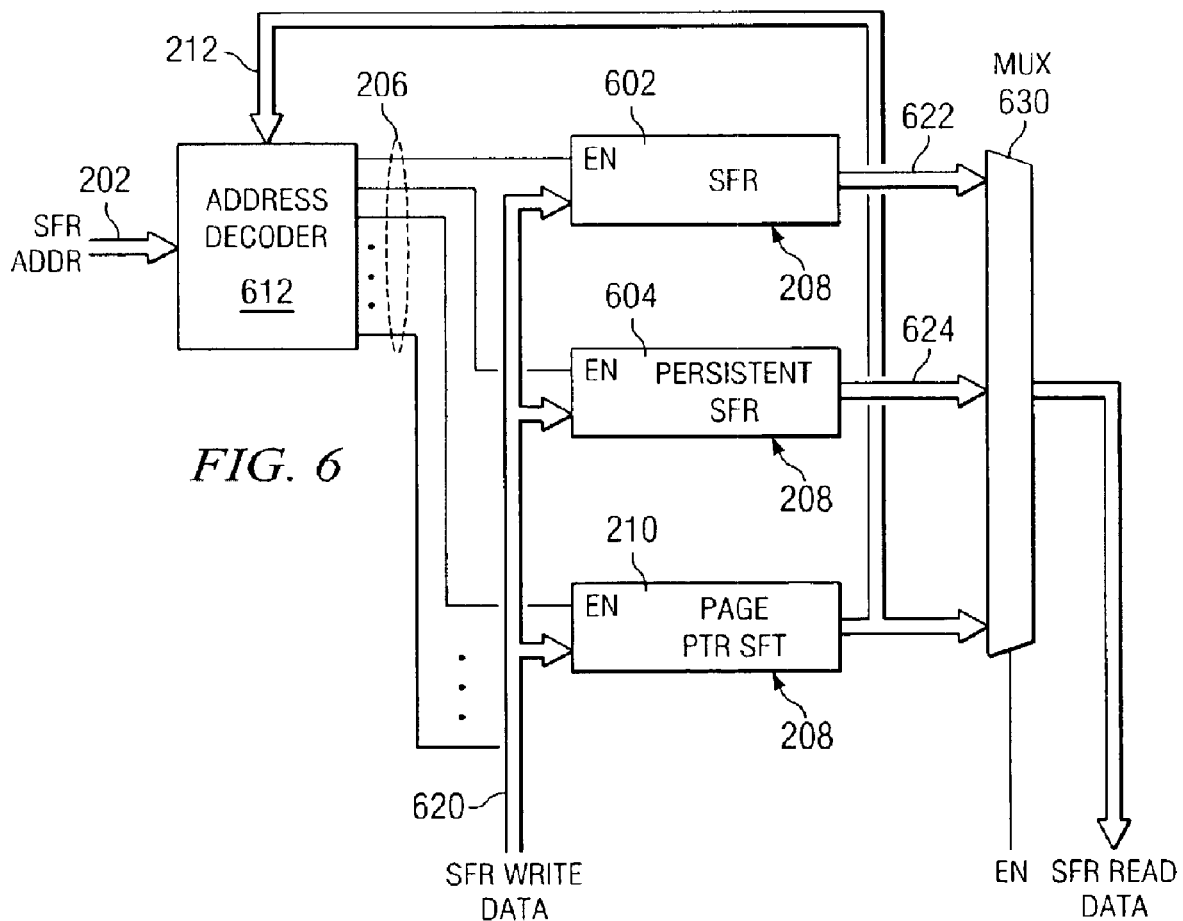
FIG. 6 illustrates a block diagram of a persistent register.

Referring now to FIG. 6, there is illustrated a block diagram of a plurality of the SFRs 208 illustrating a pageable SFR 602 and a generic persistent SFR 604 and the page pointer SFR 210, which is also a persistent SFR. There are two addresses that are required to address each SFR 208, an SFR address on the bus 202 and the contents of the page pointer SFR 210. Address buses 202 and 212 are both input to an address decoder 612, which comprises the page mapping device 204.

The address decoder 612 is a conventional combinatorial logic device that is operable to decode the address that is comprised of the SFR address and the page pointer as the eight Most Significant Bits (MSBs) to provide a concatenated address of {page pointer, SFR address}. In the present disclosure, the appropriate SFR is then selected by activating one of the plurality of select lines 206. The address decoder is hard coded to ignore the eight MSBs associated with the page pointer for all of the persistent SFRs, such that the same register is selected for all values of the page pointer, i.e., the same physical SFR exists on each page of SFR expanded memory space. However, it should be understood that a particular SFR could be rendered persistent as to only select pages in the SFR address space and not as to all pages. For example, "one SFR" could be persistent as to pages 0–6 in a ten page SFR address space, with separate physical SFRs associated with that "one SFR" address location provided for each of the remaining pages 7–9.

Each of the SFRs 210, 602 and 604 has an SFR Write Data Bus 620 associated with the Write Data input thereto and each of the respective SFRs 210, 602 and 604 has a separate SFR Read Data Bus 212, 622 and 624 associated therewith. These SFR Read Data Busses 212, 622 and 624 are input to a multiplexor 630, the output comprising the SFR Read Data.

Figure 7:
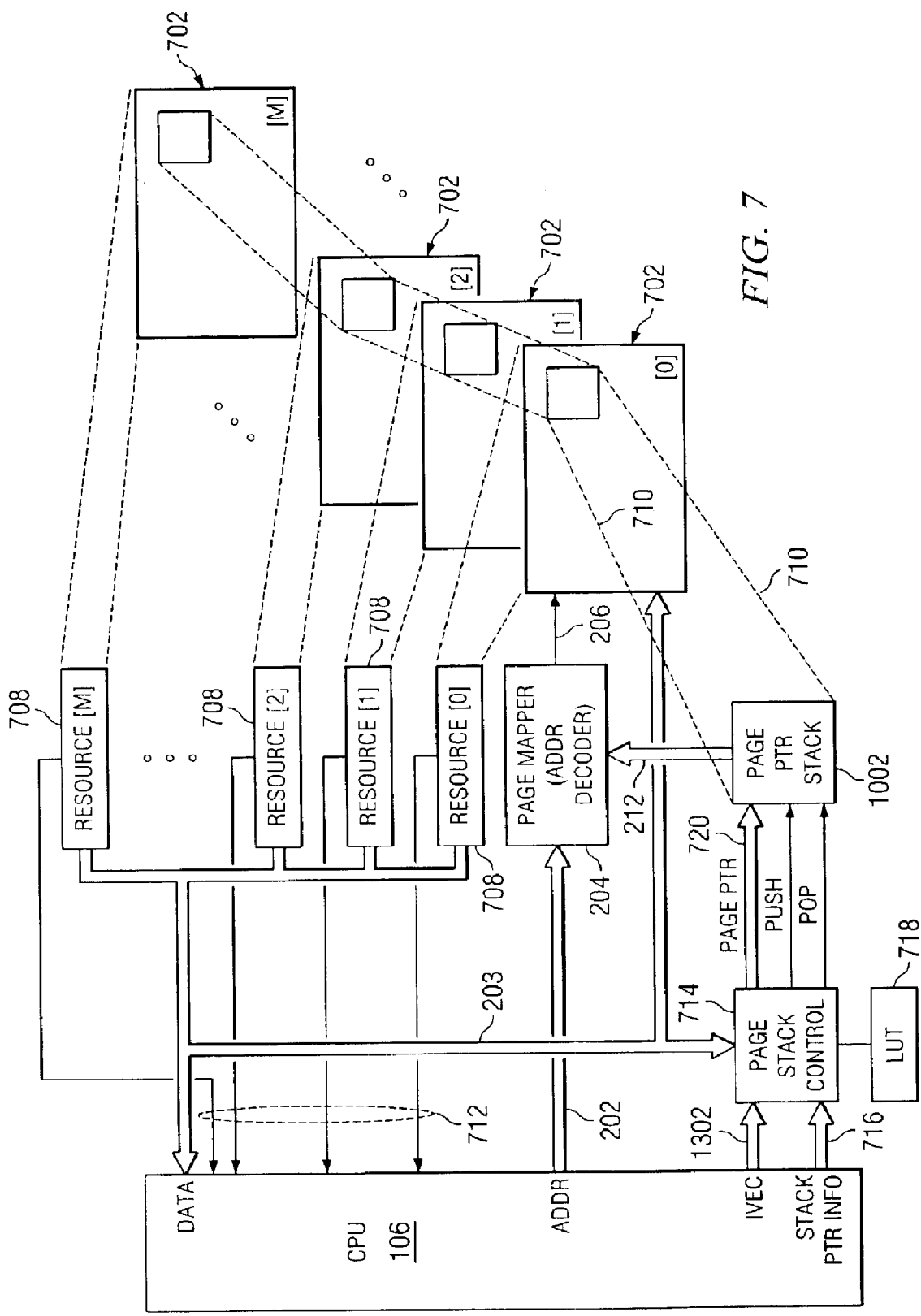
FIG. 7 illustrates a detailed diagram of the address mapping for the paging pointer.

Referring now to FIG. 7, there is illustrated a block diagram of the overall system of the present disclosure. The pages of SFRs are illustrated by pages 702 that range in page number from "0" to "N." Each SFR 208 is addressable from an address generated by a combination of an address in the SFR address space on bus 202 and the page pointer/address on bus 212 that was output from the page pointer SFR 210. The SFR addresses range from "0" to "N" (normalized to the first address) such that there are N+1 SFR addresses in the SFR address space of the CPU 106. There are M+1 pages of SFR addresses such that the total number of SFR addressable locations are (M+1)·(N+1).

In the embodiment illustrated in FIG. 7, there are illustrated a plurality of peripheral devices or resources 708, one associated with each page 702 of SFR address space. Each of the resources 708 can be any type of peripheral device, either internal or external, such as a UART, a SPI, etc. Each of these resources 708 interfaces with one or more of the physical SFRs, it being understood that each resource 708 could utilize more than one SFR on a particular page 702, or even span multiple pages. For example, a UART utilizes various timer information in one SFR, various buffer control instructions in another SFR, etc. Additionally, more than one resource 708 can be associated with a given page 702, although the illustration in FIG. 7 provides for only one resource 708 for each page for illustrative purposes only. As such, whenever one of the resources 708 is to be accessed by the CPU 106, it is necessary to set the page pointer to the associated page 702.

As noted hereinabove, the page pointer SFR 210 is a persistent SFR that comprises a physical register that exists in the SFR space of each of the pages 702. This is illustrated with the dotted lines 710. Also, as noted hereinabove, there are other persistent registers that exist within the SFR address space and, further, it is possible that the persistent register does not persist over all of the pages 702; rather, it is possible that an SFR register 208 can be persistent only over select pages 702, this being determined by the address decoder or page mapper 204.

Many of the resources 708, in this embodiment, provides an interrupt to the CPU 106, these interrupts provided on separate interrupt lines 712. When the interrupt occurs, the CPU 106, operating in its normal mode, will service that interrupt. This results in the cessation of the normal operation of the CPU 106 and the execution of an interrupt handling service routine. Internal to the CPU 106, there is an interrupt "stack" that is operable to store the return address in the program, which address constitutes the location within the program to which the program returns after handling the interrupt. Further, interrupts have various priority levels. If, during the handling of a low priority interrupt, a high priority interrupt is received, this will result in interruption of that interrupt handling service routine to then launch an interrupt handling service routine for the higher priority interrupt. When the higher priority interrupt has been handled, this will return the program to continue handling the lower priority interrupt, after which the program will return to the point of the program where the original interrupt was encountered, i.e., return to the main program code execution. This will be described in more detail hereinbelow.

The page pointer SFR 210 is, in the present embodiment, comprised of a register file 1002 that comprises a last-in first-out (LIFO) register stack, this being a hardware stack (register file 1002 hereinafter referred to as a "stack"). This allows the page pointer associated with the interrupting source to be "pushed" onto the stack 1002 during the handling of the interrupt and, when the return instruction is received from the interrupt handling service routine in the CPU 106, the stack 1002 will be "popped." This stack 1002 associated with the page pointer 210 is controlled by a page stack control block 714, which is a hardware stack control device. This page stack control block 714 is operable to interface with data such that it can receive a new page pointer to push onto the stack 1002, receive stack pointer control information from the CPU 106 through a bus 716 and also receive the interrupts on the interrupt lines 712. Interrupt vector information IVEC will also be received on a bus 1302, as will be described hereinbelow. The page stack control block 714 contains a lookup table (LUT) 718 that contains information as to page pointers for the various interrupt lines 712, each associated with one of the resources. The page stack control block 714 is operable to control the page pointer stack 1002 to either push the stack 1002 or pop the stack 1002 and also to load page pointer information therein via a bus 720. In the present embodiment, as will be described hereinbelow, the page pointer stack 1002 is three registers deep, each of the registers existing within the SFR space, i.e., each location in the stack 1002 occupies an addressable location within the SFR address space for each of the pages 702.

Figure 8:
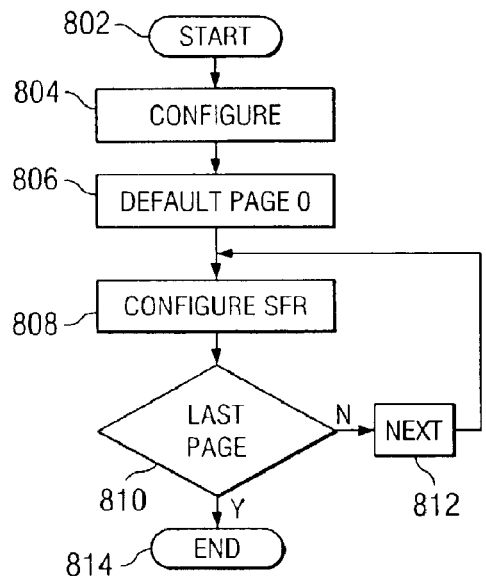
FIG. 8 illustrates a flowchart depicting the operation for configuring the SFRs on the different pages in memory.

Referring now to FIG. 8, there is illustrated a flowchart depicting the original configuration operation of the CPU 106 for configuring SFRs. The program is initiated at a Start block 802 and then proceeds to a Configure block 804 wherein the system initiates a configuration operation wherein the SFRs are initially configured. The program flows to a function block 806 to set the page value initially to a default page value of "Page0." The program then flows to a function block 808 to configure the SFR for that page and the particular SFR. In this block 808, all SFRs for a given page will be configured to the extent that configurable peripheral devices exist in association with that page. The program then flows to a decision block 810 to determine if the last page in the SFR address space has been configured. If not, then the program flows along the "N" path to a function block 812 to select the next page and then configures SFRs in that page. When the last page of the SFRs has been configured the program flows to an End block 814. It should be understood that the SFRs can be configured and reconfigured randomly also, it being noted that the SFRs may not need to be configured at all.

Figure 9:
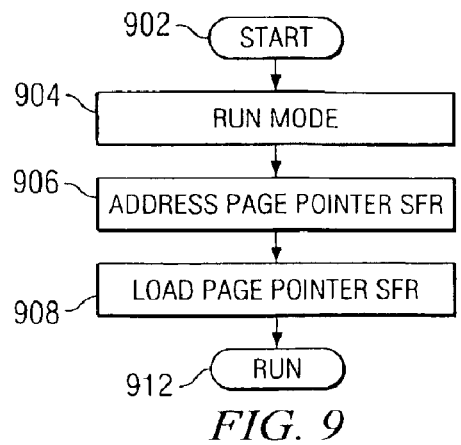
FIG. 9 illustrates a flowchart depicting the run mode operation.

Referring now to FIG. 9, there is illustrated an operation wherein the CPU 106 operates in the run mode wherein a page 702 is to be selected. This program is initiated at a block 902 and then proceeds to a function block 904 to operate in the run mode and then to a function block 906 to address the page pointer SFR 210 for the purpose of writing the page pointer therein. The page pointer is loaded into the page pointer SFR 210 in function block 908, this being facilitated via a data Write operation. The program then flows to a function block 912 wherein the CPU 106 then runs in the normal operational mode, utilizing the page pointer in the page pointer SFR 210 to define the SFR page that is currently being utilized. This operation will be described in more detail hereinbelow as to the hardware stack 1002 that is associated with the page pointer SFR 210.

Figure 10:
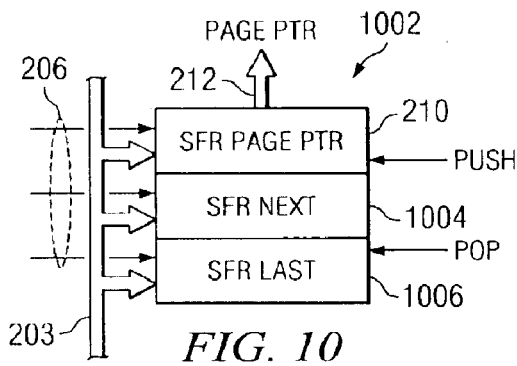
FIG. 10 illustrates a diagrammatic view of the page pointer stack.

Referring now to FIG. 10, there is illustrated a block diagram of the stack 1002. As was described hereinabove, various interrupts can be received from the peripheral units 104 (also comprising resources 708), which can be serviced. When an interrupt is acknowledged, the page pointer for the page associated with the resource 708 or peripheral 104 that generated the interrupt will be determined and then the operation of the system in SFR address space is switched to the page associated with the resource 708, which associated interrupt was acknowledged. This requires the page pointer for that page. A lookup table (not shown) is accessed to determine the page pointer for that interrupt and then this page pointer stored in the page pointer SFR 210 by pushing it to the stack 1002. However, at the end of the interrupt service routine, it is necessary to restore code execution to the original page. This is facilitated automatically upon detecting a "Return from Interrupt" (RETI) instruction thereby popping the page pointer from the stack 1002.

There are provided in this stack 1002 the page pointer SFR 210, an intermediate SFR 1004 and a bottom SFR 1006. As will be described hereinbelow, there are two levels of priority that are facilitated by the stack 1002, because the CPU 106 handles two levels of priority, thus dictating the required depth of the stack 1002. If a low priority interrupt is initially received, the page pointer for the low priority interrupt will be pushed onto the stack 1002 and the original page pointer pushed down to the SFR 1004. If a high priority interrupt is then received, this will override the operation of the low priority interrupt and this high priority interrupt's page pointer will be pushed into SFR 210, the low priority interrupt page pointer pushed into the intermediate SFR 1004 and the original page pointer pushed into the SFR 1006 at the bottom. Each of these SFRs 210, 1004 and 1006 exist within the SFR address space and are persistent, i.e., they exist in all pages. Each of the SFRs 210, 1004 and 1006 are addressable with associated enable lines 206. Each of the SFR registers 210, 1004 and 1006 also interfaces with the data bus 203, such that page pointers can actually be inserted into the stack below the current page pointer. The stack 1002 can be "pushed" or "popped" and is cleared by a reset.

Figure 11:
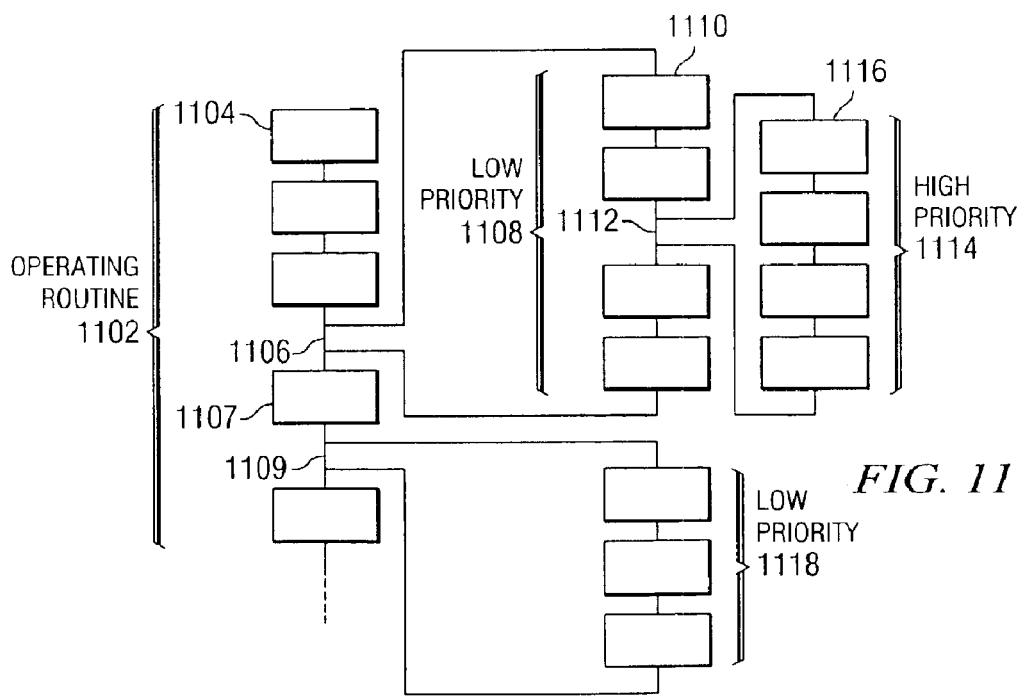
FIG. 11 illustrates a diagrammatic view of an interrupt sequence operating in the CPU.

Referring now to FIG. 11, there is illustrated a diagrammatic view of an interrupt sequence. In general, there is provided in the CPU 106 an operating routine 1102 that is comprised of a plurality of instructions, illustrated by blocks 1104. At a point 1106 in the program execution code, an interrupt is acknowledged/serviced that is associated with a low priority interrupt in one example. This will result in the execution of the interrupting resource's low priority interrupt service routine 1108 which will result in the execution of a plurality of instructions, each represented by a block 1110. If this routine 1108 follows through to the end, the program will be returned to the point 1106 in the program execution code and the operating routine 1102 will continue at the point it left off. This is a very conventional operation and, in general, when the operating routine 1102 is interrupted, the point in the program at which it vectors to the location associated with the interrupt is stored in an interrupt stack in the CPU 106 and then an RETI instruction is executed in the interrupt service routine to return back to the previous routine, whether a lower priority interrupt service routine or the main program execution code, that it was operating in.

Illustrated in FIG. 11 is the presence of a high priority interrupt that was generated at a point 1112 in the execution code of the low priority interrupt service routine 1108, the high priority interrupt service routine represented by an interrupt service routine 1114 that is comprised of a plurality of instruction blocks 1116. Since this is a high priority interrupt service routine, and the highest priority level in this example, this high priority interrupt service routine 1114 will go through to the end and return to the point 1112 in the execution code of the low priority interrupt service routine 1108. This is due to the fact that an equal priority interrupt will not override the current interrupt. It should be understood that there are only two priorities of interrupt service routines illustrated but there could be many more. Typically, a high priority interrupt will always take precedence over a low priority interrupt. However, if a low priority interrupt is received during operation of the interrupt service routine 1114, that low priority interrupt will be queued until all of the higher priority interrupts are serviced and the previous low priority interrupt service routine is completed. For example, after the low priority interrupt was received associated with the interrupt service routine 1108, a second low priority interrupt could have been received, either prior to the high priority interrupt associated with service routine 1114 or thereafter. However, it will be queued pending completion of the low priority interrupt service routine 1108 which was already being executed. Once the low priority interrupt service routine 1108 is completed and returned to the point 1106 in the program execution code, an instruction 1107 will be executed and the next low priority interrupt will be serviced at a point 1109 in the program execution code and a low priority interrupt service routine 1118 run, this service routine resulting in the return to the point 1109 in the program execution code after completion thereof. (It is noted that there is required the execution of at least one instruction in the lower level service routine before the next interrupt in the queue can be serviced). It should be understood that many low priority interrupts could be received during the servicing of a given one of the interrupts, which interrupts will then be queued and serviced individually, depending upon their priority and the order in which they are received.

Figure 12:
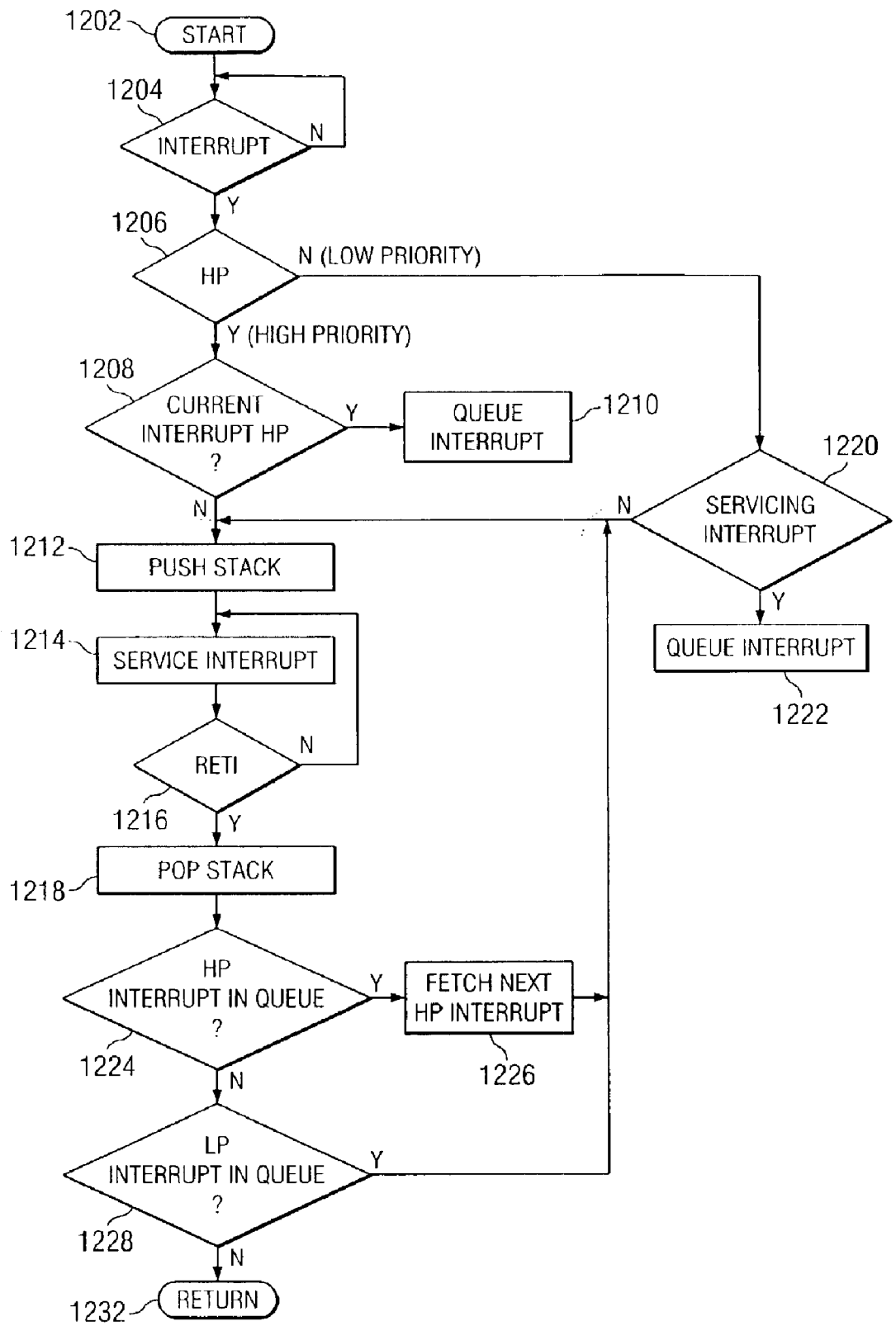
FIG. 12 illustrates a flowchart for the interrupt operation of the page pointer.

Referring now to FIG. 12, there is illustrated a flowchart depicting the operation of the stack 1002. The program is initiated at a block 1202 and then proceeds to a decision block 1204 to determine if an interrupt has occurred. If an interrupt has been acknowledged, the program flows along the "Y" path to a function block 1206 to determine if the interrupt is a high priority interrupt. If so, the program proceeds along the "Y" path to a decision block 1208 to determine if the current interrupt being serviced is a high priority interrupt. If so, this indicates that the received interrupt is on the same priority level as the interrupt currently being serviced, i.e., a high priority interrupt, and, if so, this interrupt must be queued. This will result in the program flowing along the "Y" path from the decision block 1208 to a function block 1210 where the interrupt is queued. However, if the current interrupt is not a high priority interrupt, i.e., it is either operating on the current pointer associated with the main program code or it is servicing a low priority interrupt, the program will flow along the "N" path to a function block 1212 wherein the stack is pushed such that the received interrupt is serviced with the pointer associated with the interrupting resource. The program then flows to a function block 1214 to service the interrupt and then to a decision block 1216 to determine if the interrupt service routine for the interrupt has completed, this being indicated by the generation of a Return Interrupt Signal (RETI). If not, the program will flow along the "N" path back to the input of function block 1214 to continue servicing the interrupt. When the RETI signal is received, the program will flow from the decision block 1216 along a "Y" path to a function block 1218 to pop the stack.

When it was determined that the receive interrupt was not a high priority interrupt at decision block 1206, the program will flow from the decision block 1206 along the "N" path to a decision block 1220 to determine if the system is currently servicing an interrupt, this being indicated by the stack being pushed down at least one level and, if so, this will indicate that a low priority interrupt is being serviced which is on the same level as the received interrupt, resulting in the program flowing along the "Y" path to a function block 1222 to queue the interrupt. If an interrupt is not being serviced, the program will flow along the "N" path from decision block 1220 to the input of function block 1212 where the page pointer is pushed onto the stack.

After the interrupt has been serviced (noting that this operation includes a plurality of steps), the program will flow from the function block 1218 where the stack was popped to a decision block 1224 where a decision will be made as to whether there are any high priority interrupts in the queue. This, of course, would have been the situation if the previous interrupt being serviced were associated with a high priority interrupt when a high priority interrupt is received. If there are other high priority interrupts in the queue, i.e., these received during the servicing of the current high priority interrupt, the program will flow along the "Y" path to fetch the high priority interrupt in the queue, this indicated in a function block 1226, and then to the input of the function block 1212 to push the page pointer associated with the high priority interrupt onto the stack. If there are no high priority interrupts in the high priority interrupt queue, then the program will flow along the "N" path from the decision block 1224 to a decision block 1228 to determine if there are any low priority interrupts in the low priority interrupt queue. If so, the program flows along the "Y" path to the function block 1212 in order to push the next low priority interrupt onto the stack, it being noted that the low priority interrupts will be serviced in the order they were received. If no more interrupts are in the high priority or low priority interrupt queues, then the program will flow along the "N" path from the decision block 1228 to a Return block 1232.

The Verilog listing for the operation of the interrupt and the logic associated with the page pointer stack 1002 is set forth as follows:

DESCRIPTION: SFR Page Stack Logic

CPU signals "sp_int" & "sp_reti" are qualified to produce corresponding push/pop signals for the SFR page stack.

Special function register "SFR_PAGE" is the access port to RFILE_0 or the "TOP" of the SFR page stack. This value always reflects the value of the current page being used by the address decoder.

Special function register SFR_NEXT is the access port to RFILE_1. Special function register SFR_LAST is the access port to RFILE_2.

Whenever an interrupt is acknowledged by the CPU the corresponding interrupt vector lines "cpu_ivec" are decoded and the SFR page, containing the resources associated with the peripheral that caused the interrupt, are pushed onto the top of the SFR_PAGE stack.

---

"SFR page stack"

```
                           +---------+
        SRF_PAGE <- R/W -> | RFILE_0 |  TOP
                           +---------+
        SRF_NEXT <- R/W -> | RFILE_1 |
                           +---------+
        SRF_LAST <- R/W -> | RFILE_2 |  BOTTOM
                           +---------+
```

---

SFR_PAGE can be written to/read from. Reads/writes to this SFR "will NOT" cause a coincident stack push/pop.

```
/********************************************************************/
/*-------------------- Module Declaration ---------------------------*/
module sfr_page_stack(scan_en,rst,clk,sfrpage_d,
                sfr_wr,sfr_wdata,
                sfr_sfrpgcn_rs,sfr_sfrpgcn_rdata,
                sfr_sfrpage_rs,sfr_sfrpage_rdata,
                sfr_sfrnext_rs,sfr_sfrnext_rdata,
```

-continued

```
                sfr_sfrlast_rs,sfr_sfrlast_rdata,
                sp_reti,sp_int,dbi_active);
/*------------------- Port Declarations ----------------------------*/
    input           scan_en;            // scan shift enable
    input           rst;                // asynchronous reset
    input           clk;                // chip clock
    input [7:0]     sfrpage_d;          // sfrpage "d-term"
    input           sfr_wr;             // sfr write strobe
    input [7:0]     sfr_wdata;          // sfr write data
    input           sfr_sfrpgcn_rs;     // sfr page control register select
    output [7:0]    sfr_sfrpgcn_rdata;  // sfr page control read data
    input           sfr_sfrpage_rs;     // sfr page register select
    output [7:0]    sfr_sfrpage_rdata;  // sfr page read data
    input           sfr_sfrnext_rs;     // sfr next register select
    output [7:0]    sfr_sfrnext_rdata;  // sfr next read data
    input           sfr_sfrlast_rs;     // sfr last register select
    output [7:0]    sfr_sfrlast_rdata;  // sfr last read data
    input           sp_reti;            // decrement stack pointer register
    input           sp_int;             // increment stack pointer register
    input           dbi_active;         // DBI indicator
/*------------------- Data Type Declarations ----------------------*/
    wire   [7:0]    sfr_sfrpage_rdata,  // sfrpage register read data
                    sfr_sfrnext_rdata,  // sfrnext register read data
                    sfr_sfrlast_rdata;  // sfrlast register read data
    wire   [7:0]    rfile_0,            // TOP ---- of stack
                    rfile_1,            //
                    rfile_2;            // BOTTOM - of stack
    wire            sp_int_q,           //
                    sp_reti_q;          //
    wire            sfrpage_enable;     // sfr page enable
/*------------------- Control SFR -----------------------------------*/
//
//   SFR Page Control SFR - power on reset = "enabled"
//
cyg_gwe_reg3pr_bus #(1,1'b1) u_sfrpgcn(
    .scan_en(scan_en),
    .clk(clk),
    .d(sfr_wdata[0]),
    .q(sfrpage_enable),
    .en(sfr_sfrpgcn_rs & sfr_wr),
    .r(rst)
    );
wire [7:0] sfr_sfrpgcn_rdata = {7'd0,sfrpage_enable};
/*------------------- One-shots ------------------------------------*/
//
//   Signals "sp_int" and "sp_reti" are 2 clocks long.
//   We need to make a one-clock long pulse.
//
cyg_reg3pr_bus #(2,2'b00) u_sp_int_reti_q(
        .clk(clk),
        .d({sp_int,sp_reti}),
        .q({sp_int_q,sp_reti_q}),
        .r(rst)
        );
/*------------------- Page Stack Push/Pop Generation ---------------*/
wire page_stack_push = sp_int  & ~sp_int_q  & ~dbi_active;
wire page_stack_pop  = sp_reti & ~sp_reti_q & ~dbi_active;
wire page_stack_en   = sfrpage_enable & (page_stack_push | page_stack_pop);
/*------------------- Top of SFR Page Stack ------------------------*/
wire rfile_0_en = sfr_wr & sfr_sfrpage_rs | page_stack_en;
wire [7:0] rfile_0_d = sfr_wr & sfr_sfrpage_rs ? sfr_wdata :
                       page_stack_push         ? sfrpage_d : rfile_1;
cyg_gwe_reg3pr_bus #(8,8'h00) u_rfile_0(
    .scan_en(scan_en),
    .clk(clk),
    .d(rfile_0_d),
    .q(rfile_0),
    .en(rfile_0_en),
    .r(rst)
        );
assign sfr_sfrpage_rdata = rfile_0;
/*------------------- Next SFR Stack Byte --------------------------*/
wire rfile_1_en = sfr_wr & sfr_sfrnext_rs | page_stack_en;
wire [7:0] rfile_1_d = sfr_wr & sfr_sfrnext_rs ? sfr_wdata :
                       page_stack_push         ? rfile_0  : rfile_2;
cyg_gwe_reg3pr_bus #(8,8'h00) u_rfile_1(
    .scan_en(scan_en),
    .clk(clk),
    .d(rfile_1_d),
```

```
        .q(rfile_1),
        .en(rfile_1_en),
        .r(rst)
        );
assign sfr_sfrnext_rdata = rfile_1;
/*-------------------- Last SFR Stack Byte --------------------------------*/
wire rfile_2_en = sfr_wr & sfr_sfrlast_rs | page_stack_en;
wire [7:0] rfile_2_d = sfr_wr & sfr_sfrlast_rs ? sfr_wdata :
             page_stack_push    ? rfile_1   : 8'h00;
cyg_gwe_reg3pr_bus #(8,8'h00) u_rfile_2(
        .scan_en(scan_en),
        .clk(clk),
        .d(rfile_2_d),
        .q(rfile_2),
        .en(rfile_2_en),
        .r(rst)
        );
assign sfr_sfrlast_rdata = rfile_2;
/*-------------------- end of module --------------------------------*/
endmodule
```

The following Verilog listing sets forth the Look Up Table structure:

```
// Next Stack Page Value
//
// Whenever an interrupt is acknowledged by the CPU the corresponding
// interrupt vector lines "cpu_ivec" are decoded and the SFR page,
// containing the resources associated with the peripheral that caused
// the interrupt, are pushed onto the top of the SFR_PAGE stack.
wire [15:0]       cpu_ivec;          // CPU interrupt vector input
reg  [7:0]        sfrpage_d;         //
    always @(cpu_ivec)
         case(cpu_ivec[7:0])
         // PAGE 3
             8'h63  : sfrpage_d = 8'h03; // CP2
             8'hab  : sfrpage_d = 8'h03; // DMA
         // PAGE 2
             8'h5b  : sfrpage_d = 8'h02; // CP1
             8'h83  : sfrpage_d = 8'h02; // T4
             8'h8b  : sfrpage_d = 8'h02; // adc2 WINT (SAR 08)
             8'h93  : sfrpage_d = 8'h02; // adc2 CINT (SAR 08)
         // PAGE 1
             8'h53  : sfrpage_d = 8'h01; // CP0 FIF
             8'h73  : sfrpage_d = 8'h01; // T3
             8'h7b  : sfrpage_d = 8'h01; // adc1 CINT (SAR 16 slave)
             8'h9b  : sfrpage_d = 8'h01; // CAN
             8'ha3  : sfrpage_d = 8'h01; // UART1
         // PAGE 0
             default : sfrpage_d = 8'h00;  // all other resources
         endcase
```

Figure 13:
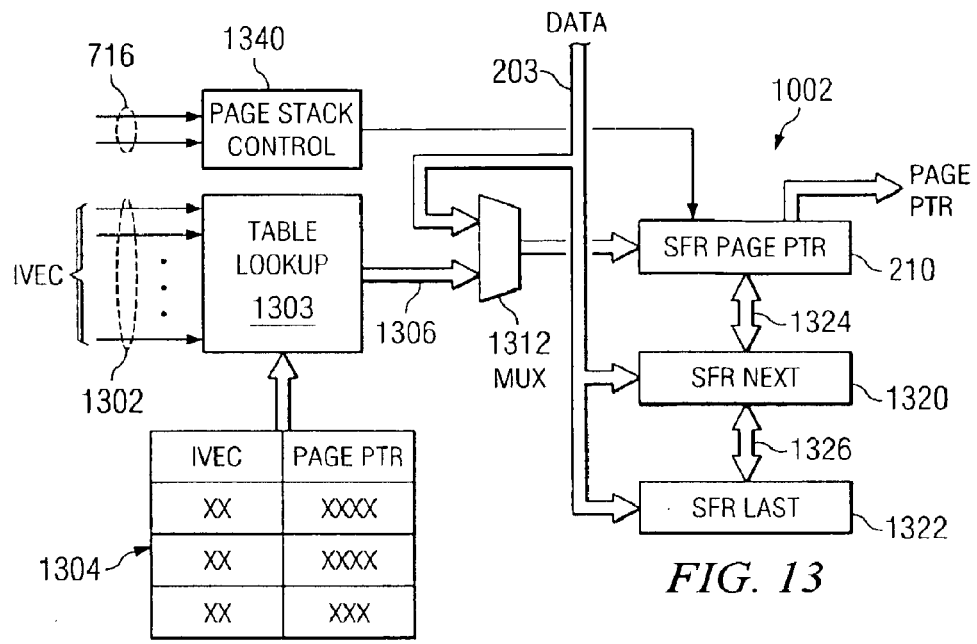
FIG. 13 illustrates a diagrammatic view of the page stack control.

Referring now to FIG. 13, there is illustrated a block diagram for the page stack control block 714. The CPU 106 stack pointer information that is output on the control lines 716 is comprised of information regarding the state of the interrupt that is being serviced. The information on the IVEC lines 1302 indicate the interrupt being acknowledged/serviced. This is input to a table lookup block 1303 that interfaces with a lookup table 1304. The interrupt table 1304 contains an association between the interrupt vector and the page pointer information. Whenever the interrupt vector being serviced is provided as an output from the CPU 106, this will automatically cause the page pointer value to be output on a bus 1306 which is then input to one input of a multiplexer 1312. Multiplexer 1312 provides an output that loads this value in the page pointer SFR 210 in the stack 1002. The stack 1002 is comprised of three SFRs, the page pointer SFR 210, an SFR 1320 labeled the SFR NEXT and an SFR 1322 labeled SFR LAST. The push operation will result in information from the output of multiplexer 1312 to be loaded into the page pointer SFR 210 and the contents thereof transferred to the SFR 1320 through a bus 1324. The contents of SFR 1320 will be transferred to the SFR 1322 through a bus 1326. In a pop operation, the reverse operation will occur. The reason that there are three registers required is due to the two levels of interrupt priority. The low priority interrupt, if it were being serviced when a high priority interrupt were received, would result in the low priority interrupt being pushed from page pointer SFR 210 to SFR 1320 and the main program page pointer being pushed to the SFR 1322. The stack does not need to be deeper than this. However, if more priority levels are required, then additional levels of the stack 1002 will be required.

When an interrupt is acknowledged, the table lookup block 1303 will index the appropriate page pointer or value (from table 1304) with the interrupt vector (1302) and place it onto bus 1306. A page stack control block 1340 determines when to push or pop the "page pointer stack" based on the CPU 106 "software stack" information. When it pushes the page stack, this is indicative that the interrupt has been acknowledged. At the end of the interrupt service routine for the interrupt, the RETI instruction will be generated and a pop operation indicated that will pop the page stack. When an interrupt is not being serviced, multiplexer 1312 is operable to receive on the other input thereof the data for input to the page pointer SFR 210 such that any of the registers 210, 1320 or 1322 can be written to. There are situations where it is desirable to write information into the SFRs 1320 and 1322, these being user defined options. Although they are not utilized for the normal stack operation, they can be facilitated, since all of the SFR locations are writeable and readable locations.

Figure 14:
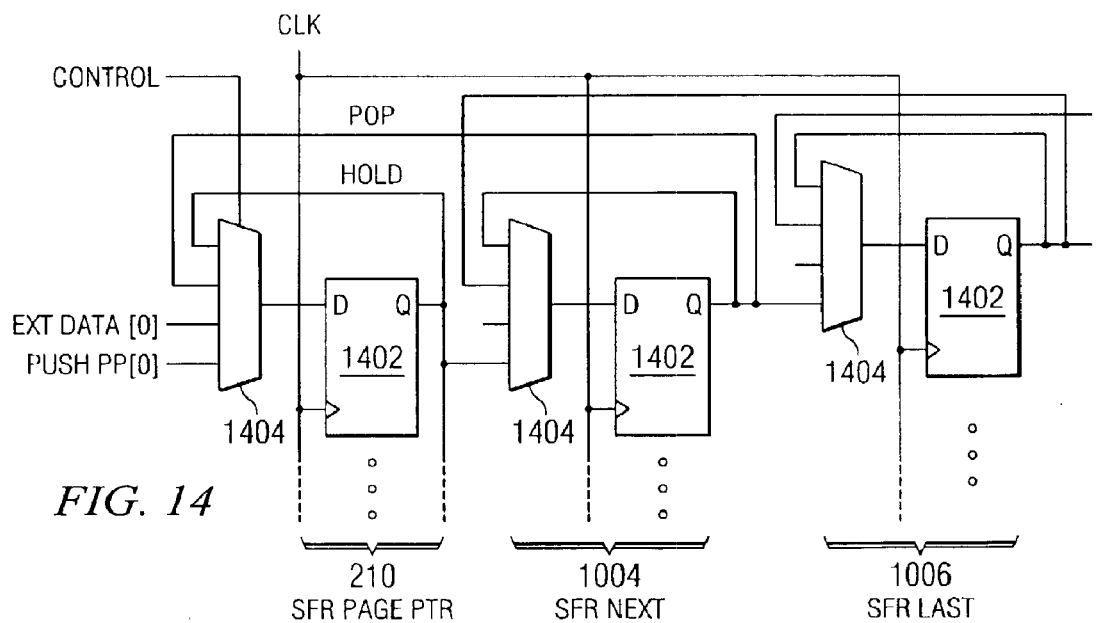
FIG. 14 illustrates a block diagram of the page pointer stack.

Referring now to FIG. 14, there is illustrated a schematic diagram of one embodiment of the page stack 1002. Each of the registers 210, 1004 and 1006 are comprised of a plurality of D-type flip flops 1402. The flip flops 1402 for only the first bit, the "0" bits, are illustrated. Each of the D-inputs has associated therewith a multiplexer 1404 that has four inputs. The first input is for the page pointer to be pushed. The second input is for CPU SFR data Writes from the SFR data bus. The third input is connected to the Q-output of the D flip flop 1402 from the next adjacent register. In this example, the multiplexer 1404 illustrated as associated with page pointer SFR 210 has a third input thereof connected to the Q-output of flip flop 1402 associated with SFR 1004. The fourth input of multiplexer 1404 is connected to the Q-output of flip flop 1402 within the associated SFR to associate directly with multiplexer 1404 to provide a Hold path. The third input is utilized for the pop operation wherein the data from the adjacent register is clocked into the flip flop 1402 and the fourth input is utilized for a hold operation wherein the data of a particular flip flop 1402 is clocked back onto itself.

Referring now to FIGS. 15A–15C, there is illustrated in three parts the map of the SFR memory space which illustrates in this embodiment five pages of SFR memory. The address for the SFR memory space within the address space of the CPU ranges from $80_h$ to $FF_h$. In the bottommost row of FIG. 15C, it can be seen that the addresses $80_h$ through $87_h$ are persistent registers, as well as select ones of registers associated with addresses in the first column, they being at addresses $90_h$, $A0_h$, $A8_h$, $B0_h$, $B8_h$, $D0$, $E0_h$ and $F0_h$. The function of each of these registers is set forth in Table 1. A description of each of these registers can be found in the data sheet for part #C8051F040/1/2/3, manufactured by Cygnal Integrated Products, assignee of the present invention, which document is a published document and constitutes a preliminary data sheet for the part associated with presently disclosed embodiment. This data sheet is incorporated herein by reference in its entirety.

TABLE 1

SFR's are listed in alphabetical order. All undefined SFR locations are reserved.

| Register | Address | SFR Page | Description |
| --- | --- | --- | --- |
| ACC | 0xE0 | All Pages | Accumulator |
| ADC0CF | 0xBC | 0 | ADC0 Configuration |
| ADC0CN | 0xE8 | 0 | ADC0 Control |
| ADC0GTH | 0xC5 | 0 | ADC0 Greater-Than High |
| ADC0GTL | 0xC4 | 0 | ADC0 Greater-Than Low |
| ADC0H | 0xBF | 0 | ADC0 Data Word High |
| ADC0L | 0xBE | 0 | ADC0 Data Word Low |
| ADC0LTH | 0xC7 | 0 | ADC0 Less-Than High |
| ADC0LTL | 0xC6 | 0 | ADC0 Less-Than Low |
| ADC2 | 0xBE | 2 | ADC2 Data Word |
| ADC2CF | 0xBC | 2 | ADC2 Analog Multiplexer Configuration |
| ADC2CN | 0xE8 | 2 | ADC2 Control |
| ADC2GT | 0xC4 | 1 | ADC2 Window Comparator Greater-Than |
| ADC2LT | 0xC6 | 1 | ADC2 Window Comparator Less-Than |
| AMX0CF | 0xBA | 0 | ADC0 Multiplexer Configuration |
| AMX0PRT | 0xBD | 0 | ADC0 Port 3 I/O Pin Select |
| AMX0SL | 0xBB | 0 | ADC0 Multiplexer Channel Select |
| AMX2SL | 0xBB | 2 | ADC2 Analog Multiplexer Channel Select |
| B | 0xF0 | All Pages | B Register |
| CAN0ADR | 0xDA | 1 | CAN0 Address |
| CAN0CN | 0xF8 | 1 | CAN0 Control |
| CAN0DATH | 0xD9 | 1 | CAN0 Data Register High |
| CAN0DATL | 0xD8 | 1 | CAN0 Data Register Low |
| CAN0STA | 0xC0 | 1 | CAN0 Status |
| CAN0TST | 0xDB | 1 | CAN0 Test Register |
| CKCON | 0x8E | 0 | Clock Control |
| CLKSEL | 0x97 | F | Oscillator Clock Selection Register |
| CPT0MD | 0x89 | 1 | Comparator 0 Mode Selection |
| CPT1MD | 0x89 | 2 | Comparator 1 Mode Selection |
| CPT2MD | 0x89 | 3 | Comparator 2 Mode Selection |
| CPT0CN | 0x88 | 1 | Comparator 0 Control |
| CPT1CN | 0x88 | 2 | Comparator 1 Control |
| CPT2CN | 0x88 | 3 | Comparator 2 Control |
| DAC0CN | 0xD4 | 0 | DAC0 Control |
| DAC0H | 0xD3 | 0 | DAC0 High |
| DAC0L | 0xD2 | 0 | DAC0 Low |
| DAC1CN | 0xD4 | 1 | DAC1 Control |
| DAC1H | 0xD3 | 1 | DAC1 High Byte |
| DAC1L | 0xD2 | 1 | DAC1 Low Byte |
| DPH | 0x83 | All Pages | Data Pointer High |
| DPL | 0x82 | All Pages | Data Pointer Low |
| EIE1 | 0xE6 | All Pages | Extended Interrupt Enable 1 |
| EIE2 | 0xE7 | All Pages | Extended Interrupt Enable 2 |
| EIP1 | 0xF6 | All Pages | Extended Interrupt Priority 1 |
| EIP2 | 0xF7 | All Pages | Extended Interrupt Priority 2 |
| EMI0CF | 0xA3 | 0 | EMIF Configuration |
| EMI0CN | 0xA2 | 0 | External Memory Interface Control |
| EMI0TC | 0xA1 | 0 | EMIF Timing Control |
| FLACL | 0xB7 | F | FLASH Access Limit |
| FLSCL | 0xB7 | 0 | FLASH Scale |
| HVA0CN | 0xD6 | 0 | High Voltage Differential Amp Control |
| IE | 0xA8 | All Pages | Interrupt Enable |
| IP | 0xB8 | All Pages | Interrupt Priority |
| OSCICL | 0x8B | F | Internal Oscillator Calibration |
| OSCICN | 0x8A | F | Internal Oscillator Control |
| OSCXCN | 0x8C | F | External Oscillator Control |
| P0 | 0x80 | All Pages | Port 0 Latch |
| P0MDOUT | 0xA4 | F | Port 0 Output Mode Configuration |
| P1 | 0x90 | All Pages | Port 1 Latch |

TABLE 1-continued

SFR's are listed in alphabetical order. All undefined SFR locations are reserved.

| Register | Address | SFR Page | Description |
| --- | --- | --- | --- |
| P1MDIN | 0xAD | F | Port 1 Input Mode Configuration |
| P1MDOUT | 0xA5 | F | Port 1 Output Mode Configuration |
| P2 | 0xA0 | All Pages | Port 2 Latch |
| P2MDIN | 0xAE | F | Port 2 Input Mode Configuration |
| P2MDOUT | 0xA6 | F | Port 2 Output Mode Configuration |
| P3 | 0xB0 | All Pages | Port 3 Latch |
| P3MDIN | 0xAF | F | Port 3 Input Mode Configuration |
| P3MDOUT | 0xA7 | F | Port 3 Output Mode Configuration |
| †P4 | 0xC8 | F | Port 4 Latch |
| †P4MDOUT | 0x9C | F | Port 4 Output Mode Configuration |
| †P5 | 0xD8 | F | Port 5 Latch |
| †P5MDOUT | 0x9D | F | Port 5 Output Mode Configuration |
| †P6 | 0xE8 | F | Port 6 Latch |
| †P6MDOUT | 0x9E | F | Port 6 Output Mode Configuration |
| †P7 | 0xF8 | F | Port 7 Latch |
| †P7MDOUT | 0x9F | F | Port 7 Output Mode Configuration |
| PCA0CN | 0xD8 | 0 | PCA Control |
| PCA0CPH0 | 0xFC | 0 | PCA Capture 0 High |
| PCA0CPH1 | 0xFE | 0 | PCA Capture 1 High |
| PCA0CPH2 | 0xEA | 0 | PCA Capture 2 High |
| PCA0CPH3 | 0xEC | 0 | PCA Capture 3 High |
| PCA0CPH4 | 0xEE | 0 | PCA Capture 4 High |
| PCA0CPH5 | 0xE2 | 0 | PCA Capture 5 High |
| PCA0CPL0 | 0xFB | 0 | PCA Capture 0 Low |
| PCA0CPL1 | 0xFD | 0 | PCA Capture 1 Low |
| PCA0CPL2 | 0xE9 | 0 | PCA Capture 2 Low |
| PCA0CPL3 | 0xEB | 0 | PCA Capture 3 Low |
| PCA0CPL4 | 0xED | 0 | PCA Capture 4 Low |
| PCA0CPL5 | 0xE1 | 0 | PCA Capture 5 Low |
| PCA0CPM0 | 0xDA | 0 | PCA Module 0 Mode Register |
| PCA0CPM1 | 0xDB | 0 | PCA Module 1 Mode Register |
| PCA0CPM2 | 0xDC | 0 | PCA Module 2 Mode Register |
| PCA0CPM3 | 0xDD | 0 | PCA Module 3 Mode Register |
| PCA0CPM4 | 0xDE | 0 | PCA Module 4 Mode Register |
| PCA0CPM5 | 0xDF | 0 | PCA Module 5 Mode Register |
| PCA0H | 0xFA | 0 | PCA Counter High |
| PCA0L | 0xF9 | 0 | PCA Counter Low |
| PCA0MD | 0xD9 | 0 | PCA Mode |
| PCON | 0x87 | All Pages | Power Control |
| PSCTL | 0x8F | 0 | Program Store R/W Control |
| PSW | 0xD0 | All Pages | Program Status Word |
| RCAP2H | 0xCB | 0 | Timer/Counter 2 Capture/Reload High |
| RCAP2L | 0xCA | 0 | Timer/Counter 2 Capture/Reload Low |
| RCAP3H | 0xCB | 1 | Timer/Counter 3 Capture/Reload High |
| RCAP3L | 0xCA | 1 | Timer/Counter 3 Capture/Reload Low |
| RCAP4H | 0xCB | 2 | Timer/Counter 4 Capture/Reload High |
| RCAP4L | 0xCA | 2 | Timer/Counter 4 Capture/Reload Low |
| REF0CN | 0xD1 | 0 | Programmable Voltage Reference Control |
| RSTSRC | 0xEF | 0 | Reset Source Register |
| SADDR0 | 0xA9 | 0 | UART 0 Slave Address |
| SADEN0 | 0xB9 | 0 | UART 0 Slave Address Enable |
| SBUF0 | 0x99 | 0 | UART 0 Data Buffer |
| SBUF1 | 0x99 | 1 | UART 1 Data Buffer |
| SCON0 | 0x98 | 0 | UART 0 Control |
| SCON1 | 0x98 | 1 | UART 1 Control |
| SFRPAGE | 0x84 | All Pages | SFR Page Register |
| SFRPGCN | 0x96 | F | SFR Page Control Register |
| SFRNEXT | 0x85 | All Pages | SFR Next Page Stack Access Register |
| SFRLAST | 0x86 | All Pages | SFR Last Page Stack Access Register |
| SMB0ADR | 0xC3 | 0 | SMBus Slave Address |
| SMB0CN | 0xC0 | 0 | SMBus Control |
| SMB0CR | 0xCF | 0 | SMBus Clock Rate |
| SMB0DAT | 0xC2 | 0 | SMBus Data |
| SMB0STA | 0xC1 | 0 | SMBus Status |
| SP | 0x81 | All Pages | Stack Pointer |
| SPI0CFG | 0x9A | 0 | SPI Configuration |
| SPI0CKR | 0x9D | 0 | SPI Clock Rate Control |
| SPI0CN | 0xF8 | 0 | SPI Control |
| SPI0DAT | 0x9B | 0 | SPI Data |
| SSTA0 | 0x91 | 0 | UART0 Status and Clock Selection |
| TCON | 0x88 | 0 | Timer/Counter Control |
| TH0 | 0x8C | 0 | Timer/Counter 0 High |
| TH1 | 0x8D | 0 | Timer/Counter 1 High |
| TL0 | 0x8A | 0 | Timer/Counter 0 Low |
| TL1 | 0x8B | 0 | Timer/Counter 1 Low |

TABLE 1-continued

SFR's are listed in alphabetical order. All undefined SFR locations are reserved.

| Register | Address | SFR Page | Description |
| --- | --- | --- | --- |
| TMOD | 0x89 | 0 | Timer/Counter Mode |
| TMR2CF | 0xC9 | 0 | Timer/Counter 2 Configuration |
| TMR2CN | 0xC8 | 0 | Timer/Counter 2 Control |
| TMR2H | 0xCD | 0 | Timer/Counter 2 High |
| TMR2L | 0xCC | 0 | Timer/Counter 2 Low |
| TMR3CF | 0xC9 | 1 | Timer/Counter 3 Configuration |
| TMR3CN | 0xC8 | 1 | Timer 3 Control |
| TMR3H | 0xCD | 1 | Timer/Counter 3 High |
| TMR3L | 0xCC | 1 | Timer/Counter 3 Low |
| TMR4CF | 0xC9 | 2 | Timer/Counter 4 Configuration |
| TMR4CN | 0xC8 | 2 | Timer/Counter 4 Control |
| TMR4H | 0xCD | 2 | Timer/Counter 4 High |
| TMR4L | 0xCC | 2 | Timer/Counter 4 Low |
| WDTCN | 0xFF | All Pages | Watchdog Timer Control |
| XBR0 | 0xE1 | F | Port I/O Crossbar Control 0 |
| XBR1 | 0xE2 | F | Port I/O Crossbar Control 1 |
| XBR2 | 0xE3 | F | Port I/O Crossbar Control 2 |
| XBR3 | 0xE4 | F | Port I/O Crossbar Control 3 |

Figure 16:
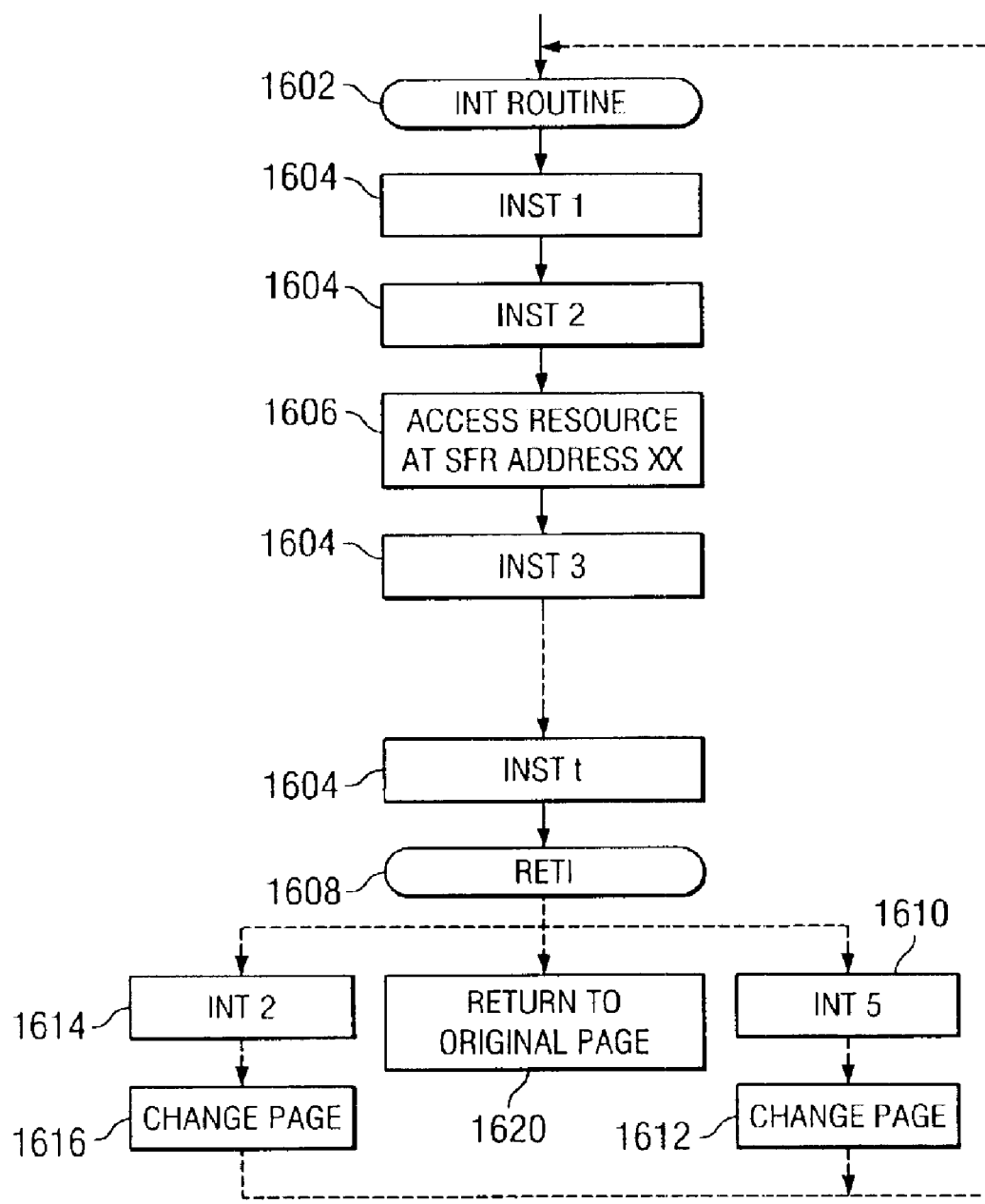
FIG. 16 illustrates a flow chart for one example of the use of an interrupt service routine for two different resources.

Referring now to FIG. 16, there is illustrated a flowchart depicting how registers can be changed for different resources as a result of the generation of an interrupt and still utilize the same interrupt service routine. In the example of FIG. 16, there is illustrated a generic interrupt service routine that is initiated at a block 1602 and then proceeds through a number of instruction blocks 1604 to a function block 1606 wherein a resource unique SFR is accessed at a particular SFR address of, in this example, $XX_h$. This address is defined for the interrupt service routine as being required for the operation of the resource, it being understood that a number of SFRs may be required for the operation of the interrupt service routine that are unique to the resource generating the interrupt, although only the address of a single SFR is illustrated in function block 1606. The other SFR access function blocks are not shown for simplicity purposes.

If the interrupt service routine was that associated with, for example, a UART, the interrupt service routine would be applicable for any of the UARTs' accessed, regardless of the page. However if the UARTs are on the same page, then the SFR address on that page must be different. If the set of SFRs associated with the operation of different UARTs can be placed on different pages but at the same corresponding SFR addresses on each page, then the interrupt service routine need not be changed, i.e., the same SFR addresses can be utilized. In the present embodiment, only a single SFR is disclosed at address $XX_h$, but the interrupt service routine for servicing a single UART (or other resource) may actually address other SFR addresses on the selected page. This is due to the fact that a number of functions of a particular resource, such as a UART, requires multiple SFRs.

Once the particular SFR associated with address $XX_h$ is accessed and the function associated with this access is completed, the interrupt service routine will then proceed through additional instruction blocks 1604 to the end of the interrupt service routine at a block 1608 wherein an RETI instruction will be generated to return operation from the interrupt service routine. However, if there are other interrupts pending at the same level, they will be acknowledged and the associated interrupt service routine executed. In one example, it is possible that an interrupt were received at a block 1610, INT 5. This interrupt would cause a jump to the appropriate interrupt service routine. The generation of this interrupt will cause the page indexed by INT 5 to be pushed on top of the page stack 1002, as indicated by a function block 1612 as the CPU 106 vectors to the interrupt service routine associated with servicing that interrupt. The change page operation is independent of the operation of the interrupt service routine and is hardware driven. However, it is noted that this does not prevent the interrupt service routine from changing pages. Anytime software changes the page pointer, it is the software that maintains knowledge of the location on which page the system is operating. Similarly, if another interrupt for a similar UART were generated, as indicated by a function block 1614 for INT 2, this would result in the interrupt service routine being executed again, but at the page indexed by INT 2, which is facilitated by a change page block 1616. Each of the change page blocks 1612 and 1616 operate in hardware, as described hereinabove, and therefore will not require instruction steps in the processor to facilitate this page change, nor will the function block 1606 be required to change, as the resource is associated with the same SFR address in both pages associated with the interrupts in block 1610 and 1614.

Once all the interrupts have been serviced, flow will be to a function block 1620 to return the operation to the original page. Of course, there can be other branches to other interrupt service routines for other resources that utilize different sets of instructions.

Although the preferred embodiment has been described in detail, it should be understood that various changes, substitutions and alterations can be made therein without departing from the spirit and scope of the invention as defined by the appended claims.

What is claimed is:

1. A method for changing pages of memory in an indirect addressed memory having a plurality of addressable locations therein, comprising the steps of:

storing an index indicative of the page of the memory being addressed;

addressing the memory with a direct address that selects one or more of the addressable locations in the addressed page of memory;

receiving an interrupt from a resource capable of generating an interrupt, which interrupt has associated therewith a defined one of the pages of memory;

in response to the step of generating the interrupt, changing the value of the stored index to an index associated with the defined one of the pages of memory associated with the resource; and in response to receiving a signal indicative of the generated interrupt having been serviced by a system that services interrupts, changing the stored index to a different index.

2. The method of claim 1, wherein the step of changing the stored index to a different index comprises changing the stored index to the index that was stored prior to the step of generating the interrupt.

3. The method of claim 1, wherein the step of changing the value of the index comprises the steps of:

arranging a plurality of memory locations in a register stack configuration;

assigning priority to the memory locations, with the highest priority one thereof operable to store the index indicative of the page of the memory being addressed in the step of storing;

wherein the step of changing the value of the stored index to an index associated with the defined one of the pages of memory associated with the resource comprises transferring the index stored in the highest priority one of the memory locations in the register stack to a lower priority one of the memory locations therein; and wherein the step of changing the stored index to a different index in response to receiving a signal indicative of the generated interrupt having been serviced by a system that services interrupts comprises transferring an index stored in other than the highest priority one of the memory locations to the highest priority one thereof.

4. The method of claim 3, wherein the step of transferring the index stored in the highest priority one of the memory locations in the register stack to a lower priority one of the memory locations therein comprises transferring the index stored in the highest priority one of the memory locations in the register stack to the next lower priority one of the memory locations therein.

5. The method of claim 3, wherein the step of transferring an index stored in other than the highest priority one of the memory locations to the highest priority one thereof comprises transferring an index stored to the next to the highest priority one of the memory locations to the highest priority one thereof.

6. The method of claim 1, wherein the step of changing the stored index to a different index comprises the step of changing the stored index to an index different than the index that was stored prior to the step of generating the interrupt.

7. The method of claim 1, wherein the system that services the interrupt comprises a processor having a processor that executes instructions and having a processor address space, and wherein each page of the memory exists within at least the same portion of the processor address space, and the step of addressing comprises the step of generating an address within the same portion of the processor address space to address one or more of the addressable locations in the page of the memory.

8. The method of claim 7, wherein the processor is operable to, in response to the step of generating the interrupt, receive and acknowledge the interrupt and service the acknowledged interrupt, and the processor is further operable to generate the signal indicative of the generated interrupt having been serviced after servicing thereof.

9. The method of claim 8, wherein the step of changing the value of the index comprises the steps of:

arranging a plurality of memory locations in a register stack configuration external to the processor;

assigning priority to the register locations, with the highest priority one thereof operable to store the index indicative of the page of the memory being addressed in the step of storing;

wherein the step of changing the value of the stored index to an index associated with the defined one of the pages of memory associated with the resource comprises transferring the index stored in the highest priority one of the memory locations in the register stack to a lower priority one of the memory locations therein; and wherein the step of changing the stored index to a different index in response to receiving a signal indicative of the generated interrupt comprises transferring an index stored in other than the highest priority one of the memory locations to the highest priority one thereof.

10. The method of claim 9, wherein the step of transferring the index stored in the highest priority one of the memory locations in the register stack to a lower priority one of the memory locations therein comprises transferring the index stored in the highest priority one of the memory locations in the register stack to the next lower priority one of the memory locations therein.

11. The method of claim 9, wherein the step of transferring an index stored in other than the highest priority one of the memory locations to the highest priority one thereof comprises transferring an index stored in the next to the highest priority one of the memory locations to the highest priority one thereof.

12. The method of claim 8, wherein the step of changing the value of the index comprises the steps of:

arranging a plurality of memory locations in a last in first out push-pop register stack external to the processor;

wherein the step of changing the value of the stored index to an index associated with the defined one of the pages of memory associated with the resource comprises pushing the index stored in the top of the register stack; and wherein the step of changing the stored index to a different index in response to receiving a signal indicative of the generated interrupt comprises popping the register stack, such that the stored index that existed prior to the immediately preceding push operation is returned to the top of the register stack.

13. The method of claim 9, wherein the register stack exists within the address space of the same portion of the processor address space.

14. The method of claim 13, wherein the contents of the register stack exists on at least two pages of the memory.

15. The method of claim 14, wherein the register stack comprises a single hardware register stack.

16. A method for changing pages of memory in an indirect addressed memory in a processor based system, the indirect addressed memory having a plurality of addressable locations therein, comprising the steps of:

storing an index indicative of the page of the memory being addressed;

generating a direct address in a processor address space of a processor, which processor is operable to execute instructions, and which processor address space defines an address space of available direct addresses that can be generated by the processor for the purpose of direct addressing of memory;

addressing the memory with a direct address that selects one or more of the addressable locations in the addressed page of memory;

receiving an interrupt from a resource capable of generating an interrupt, which interrupt has associated therewith a defined one of the pages of memory;

receiving and acknowledging the interrupt by the processor in response to the step of generating the interrupt;

in response to the step of acknowledging the interrupt by the processor, changing the value of the stored index to an index associated with the defined one of the pages of memory associated with the resource;

the processor generating a signal indicative of the processor having serviced the interrupt; and in response to step of generating the signal indicative of the processor having serviced the interrupt, changing the stored index to a different index.

17. The method of claim 16 wherein the step of changing the stored index to a different index comprises changing the stored index to the index that was stored prior to the step of generating the interrupt.

18. The method of claim 16, wherein the step of changing the value of the index comprises the steps of:

arranging a plurality of memory locations in a register stack configuration;

assigning priority to the memory locations, with the highest priority one thereof operable to store the index indicative of the page of the memory being addressed in the step of storing;

wherein the step of changing the value of the stored index to an index associated with the defined one of the pages of memory associated with the resource comprises transferring the index stored in the highest priority one of the memory locations in the register stack to a lower priority one of the memory locations therein; and wherein the step of changing the stored index to a different index in response to receiving a signal indicative of the processor having serviced the interrupt comprises transferring an index stored in other than the highest priority one of the memory locations to the highest priority one thereof.

19. The method of claim 18, wherein the step of transferring the index stored in the highest priority one of the memory locations in the register stack to a lower priority one of the memory locations therein comprises transferring the index stored in the highest priority one of the memory locations in the register stack to the next lower priority one of the memory locations therein.

20. The method of claim 18, wherein the step of transferring an index stored in other than the highest priority one of the memory locations to the highest priority one thereof comprises transferring an index stored to the next to the highest priority one of the memory locations to the highest priority one thereof.

21. The method of claim 18, wherein the step of arranging a plurality of memory locations in a register stack configuration external to the processor comprises the step of arranging a plurality of memory locations in a register stack configuration external to the processor.

22. The method of claim 16, wherein the step of changing the stored index to a different index comprises the step of changing the stored index to an index different than the index that was stored prior to the step of generating the interrupt.

23. The method of claim 18, wherein the register stack exists within the processor address space at a stack address and is addressable by the processor to change the contents thereof.

24. The method of claim 23, wherein the contents of the register stack exists on at least two pages of the memory at the stack address.

25. The method of claim 24, wherein the register stack comprises a single hardware register stack external to the processor.

26. The method of claim 16, wherein the processor and resource are formed on a common integrated circuit.

27. A memory access system for changing pages of memory in an indirect addressed memory having a plurality of addressable locations therein, comprising:

an index memory having stored therein an index indicative of the page of the memory being addressed;

an address generator for addressing the memory with a direct address that selects one or more of the addressable locations in the addressed page of memory;

an interrupt handler for receiving an interrupt from a resource capable of generating an interrupt, which interrupt has associated therewith a defined one of the pages of memory;

said interrupt handler, in response to receiving the interrupt, changing the value of the stored index to an index associated with the defined one of the pages of memory associated with the resource; and said interrupt handler, in response to receiving a signal indicative of the generated interrupt having been serviced by a system that services interrupts, changing the stored index in said index memory to a different index.

28. The memory access system of claim 27, wherein said interrupt handler, when changing the stored index in said index memory to a different index is operable to change the stored index to the index that was stored in said index memory prior to the step of generating the interrupt.

29. The memory access system of claim 27, wherein said index memory comprises:

a plurality of memory locations arranged in a register stack;

each of said memory locations assigned a priority, with the highest priority one thereof operable to store the index indicative of the page of the memory being addressed by the index stored in said index memory;

wherein said interrupt handler, when changing the value of the stored index to an index associated with the defined one of the pages of memory associated with the resource, is operable to transfer the index stored in the highest priority one of the memory locations in the register stack to a lower priority one of the memory locations therein; and wherein said interrupt handler, when changing the stored index to a different index in response to receiving a signal indicative of the generated interrupt having been serviced by a system that services interrupts, is operable to transfer an index stored in other than the highest priority one of the memory locations to the highest priority one thereof.

30. The memory access system of claim 29, wherein said interrupt handler, when transferring the index stored in the highest priority one of the memory locations in said register stack to a lower priority one of the memory locations therein, is operable to transfer the index stored in the highest priority one of the memory locations in said register stack to the next lower priority one of the memory locations therein.

31. The memory access system of claim 29, wherein said interrupt handler, when transferring an index stored in other than the highest priority one of the memory locations in said register stack to the highest priority one thereof, is operable to transfer an index stored to the next to the highest priority one of the memory locations in said register stack to the highest priority one thereof.

32. The memory access system of claim 27, wherein said interrupt handler, when changing the stored index to a different index, is operable to change the stored index to an index different than the index that was stored prior to handling of the interrupt.

33. The memory access system of claim 27, wherein the system that services the interrupt comprises a processor having a processor that executes instructions and having a processor address space, and wherein each page of the memory exists within at least the same portion of said processor address space, and said address generator operable to generate said direct address within the same portion of said processor address space to address one or more of the addressable locations in the page of the memory.

34. The memory access system of claim 33, wherein said processor is operable to, in response to generation of the interrupt, receive and acknowledge the interrupt and service the acknowledged interrupt, and said processor is further operable to generate the signal indicative of the generated interrupt having been serviced after servicing thereof.

35. The memory access system of claim 34, wherein said index memory comprises:
   a plurality of memory locations arranged in a register stack;
   each of said memory locations assigned a priority to the register locations, with the highest priority one thereof operable to store the index indicative of the page of the memory being addressed by said address generator;
   wherein said interrupt handler, when changing the value of the stored index to an index associated with the defined one of the pages of memory associated with the resource, is operable to transfer the index stored in the highest priority one of the memory locations in the register stack to a lower priority one of the memory locations therein; and
   wherein said interrupt handler, when changing the stored index to a different index in response to receiving a signal indicative of the generated interrupt having been serviced by a system that services interrupts, is operable to transfer an index stored in other than the highest priority one of the memory locations to the highest priority one thereof.

36. The memory access system of claim 34, wherein said index memory comprises:
   a plurality of memory locations arranged in a last in first out push-pop register stack external to said processor;
   wherein said interrupt handler, when changing the value of the stored index to an index associated with the defined one of the pages of memory associated with the resource is operable to push the index stored in the top of the register stack; and
   wherein said interrupt handler, when changing the stored index to a different index in response to receiving a signal indicative of the generated interrupt, is operable to pop the register stack, such that the stored index that existed prior to the immediately preceding push operation is returned to the top of said register stack.

37. The memory access system of claim 33, wherein said register stack exists within the address space of the same portion of the processor address space for each page of memory.

38. The memory access system of claim 37, wherein the contents of said register stack exists on at least two pages of the memory.

39. The memory access system of claim 38, wherein said register stack comprises a single hardware register stack.

40. A memory control system for changing pages of memory in an indirect addressed memory in a processor based system, the indirect addressed memory having a plurality of addressable locations therein, comprising:
   an index memory having stored therein an index indicative of the page of the memory being addressed;
   a processor for executing instructions;
   said processor for generating a direct address in a processor address space of said processor, which said processor address space defines an address space of available direct addresses that can be generated by said processor for the purpose of direct addressing of memory;
   said generated direct address addressing the memory to select one or more of the addressable locations in the addressed page of memory;
   an interrupt handler for receiving an interrupt from a resource capable of generating an interrupt, which interrupt has associated therewith a defined one of the pages of memory;
   said processor operable to receive and acknowledge the interrupt in response to generation of the interrupt;
   said interrupt handler, in response to said processor acknowledging the interrupt, changing the value of the stored index to an index associated with the defined one of the pages of memory associated with the resource;
   said processor generating a signal indicative of the processor having serviced the interrupt; and
   said interrupt handler, in response to said processor generating the signal indicative of said processor having serviced the interrupt, changing the stored index to a different index.

41. The memory control system of claim 40 wherein said interrupt handler is operable to change the stored index to the index that was stored prior to generation of the interrupt.

42. The memory control system of claim 40, wherein said index memory comprises:
   a plurality of memory locations arranged in a register stack;
   each of said memory locations assigned a priority, with the highest priority one thereof operable to store the index indicative of the page of the memory being addressed in the step of storing;
   wherein said interrupt handler, when changing the value of the stored index to an index associated with the defined one of the pages of memory associated with the resource, is operable to transfer the index stored in the highest priority one of the memory locations in said register stack to a lower priority one of the memory locations therein; and
   wherein said interrupt handler, when changing the stored index to a different index in response to receiving a signal indicative of said processor having serviced the interrupt, is operable to transfer an index stored in other than the highest priority one of the memory locations to the highest priority one thereof.

43. The memory control system of claim 42, wherein said interrupt handler, when transferring the index stored in the highest priority one of the memory locations in said register stack to a lower priority one of the memory locations therein, is operable to transfer the index stored in the highest priority one of the memory locations in said register stack to the next lower priority one of the memory locations therein.

44. The memory control system of claim 42, wherein said interrupt handler, when transferring an index stored in other than the highest priority one of the memory locations in said register stack to the highest priority one thereof, is operable to transfer an index stored to the next to the highest priority one of the memory locations to the highest priority one thereof.

45. The memory control system of claim 42, wherein said register stack is external to said processor.

46. The memory control system of claim 40, wherein said interrupt handler, when changing the stored index to a different index, is operable to changed the stored index to an index different than the index that was stored prior to the generation of the interrupt.

47. The memory control system of claim 42, wherein said register stack exists within said processor address space at a stack address and is addressable by said processor to change the contents thereof.

48. The memory control system of claim 47, wherein the contents of said register stack exists on at least two pages of the memory at said stack address.

49. The memory control system of claim 48, wherein said register stack comprises a single hardware register stack external to the processor.

50. The memory control system of claim 40, wherein said processor and resource are formed on a common integrated circuit.

\* \* \* \* \*